United States Patent [19]
Yates

[11] Patent Number: 5,938,264
[45] Date of Patent: Aug. 17, 1999

[54] TRUCK BOX WITH ONE-PIECE END WALL

[76] Inventor: Anthony Yates, 1000 Becks Lake Rd., Cantonment, Fla. 32533

[21] Appl. No.: 09/163,800

[22] Filed: Sep. 30, 1998

[51] Int. Cl.[6] ......................................................... B60N 9/00
[52] U.S. Cl. ............................ 296/37.6; 224/404; 220/62; 220/689
[58] Field of Search ............................ 296/37.6; 220/62, 220/62.1, 689; 224/404

[56] References Cited

U.S. PATENT DOCUMENTS 1,238,413  8/1917  Leonard ..................................... 220/62
5,484,092  1/1996  Cheney ..................................... 224/404
5,743,584  4/1998  Lance et al. ............................ 296/37.6

*Primary Examiner*—Dennis H. Pedder
*Attorney, Agent, or Firm*—Holland & Knight LLP

[57] ABSTRACT

A truck box comprises a front wall, back wall, bottom wall, top lid and a pair of opposed end walls each of which is fabricated from a one-piece, continuous section of aluminum plate which undergoes bending operations to form a one-piece end wall construction.

16 Claims, 3 Drawing Sheets

TRUCK BOX WITH ONE-PIECE END WALL

FIELD OF THE INVENTION

This invention relates to aluminum truck boxes, and, more particularly, to a cross-over truck box having a pair of one-piece end walls each formed from a single section of aluminum treadplate.

BACKGROUND OF THE INVENTION

One of the most popular accessories for light duty trucks and recreational vehicles is a truck box used to store and secure a variety of tools and other items. There are a number of different types of truck boxes currently available including cross-over boxes, sidemount boxes, chest boxes, topmount boxes, RV boxes, and others. Each truck box is typically formed of aluminum treadplate, and comprises a front wall, back wall, bottom wall and opposed end walls which are interconnected by welding to form a hollow interior. The box is closed by a top wall or lid pivotal on a hinge between an open position and a closed position.

Gas springs are commonly employed in truck boxes to assist with lifting of the top lid to an open position, and, to maintain the lid in such open position during use. In most single lid truck box designs, a gas spring is located adjacent each of the end walls of the truck box to provide sufficient lifting force for the top lid. One end of each gas spring is mounted to a vertically extending partition or to the end wall itself, and the opposite end of each gas spring is mounted to the top lid. Additionally, many truck box designs incorporate a tool holder, for screwdrivers and the like, which is located adjacent one or both of the end walls.

One disadvantage of current truck box designs, particularly cross-over type boxes, involves the fabrication of the end walls. In both single lid and double lid cross-over truck boxes, each end wall comprises an upper vertical section and a lower vertical section which are welded to the bottom wall, and to the front and back walls, to close the ends of the truck box. The upper and lower vertical sections are interconnected by a horizontal section which extends over the side rail of the truck bed when the box is mounted in place on the vehicle. Within the interior of the cross-over box, a separate vertical partition is mounted to the horizontal section, which, in the case of single lid boxes, receives one end of the gas spring. A separate horizontal section or plate carried by the vertical partition and/or lower vertical section forms the tool holder.

All of the sections and plates noted above are individual pieces which must be separately formed, welded together, and then welded to the front, back and/or bottom walls, in order to form the completed truck box. This construction substantially adds to the cost of fabrication both in terms of the number of separate pieces which must be formed and stocked by the box manufacturer, and the labor required to perform all of the individual welding operations on both end walls of each truck box.

SUMMARY OF THE INVENTION

It is therefore among the objectives of this invention to provide a truck box in which both end walls are formed without multiple welding operations, which is relatively easy to fabricate, and, which is more economical than current truck box designs.

These objectives are accomplished in a truck box comprising a front wall, a back wall, a bottom wall, a top lid, and, a pair of opposed end walls each of which is fabricated from a continuous section of aluminum plate which undergoes bending operations to form a one-piece end wall construction.

This invention is predicated upon the concept of constructing opposed end walls for an aluminum cross-over type truck box in which each end wall is formed from a continuous section of aluminum tread plate or mill finish aluminum. In the presently preferred embodiment, the aluminum plate is initially stamped, punched and otherwise formed to the desired dimensions and configuration, and then bent at selected locations to form a continuous, one-piece end wall. Each end wall of the truck box of this invention has an upper vertical section, a vertically extending partition, a horizontal section extending between the upper vertical section and vertically extending partition, a second horizontal section or tool holder extending from the vertically extending partition, and, a lower vertical section extending from the tool holder. Both the vertically extending partition and the tool holder are formed by bending a portion of the aluminum plate against itself, and the remaining sections of each end wall include a single thickness of the aluminum plate.

The vertically extending partition is oriented parallel to the upper vertical section and is laterally spaced therefrom with the horizontal section extending therebetween. The vertical partition is formed with one or more throughbores in a position to receive and mount one end of a gas spring. One gas spring extends from the vertical partition of each end wall to a reinforcing bar in the top lid for assisting in opening and closing the top lid as described above.

The tool holder is a horizontally extending member formed from two sections of the aluminum plate which are folded over against one another and extend between the vertical partition and the lower vertical section. Both sections of the aluminum plate which form the tool holder are punched with a series of spaced bores. These bores align with one another when the two sections are bent over against one another to provide receptacles for mounting screwdrivers or other tools within the interior of the truck box.

Unlike prior cross-over type truck box designs, the end wall of this invention is formed from a continuous section of aluminum plate in a one-piece construction. There are no separate pieces to be welded together in individual welding operations. The only welding operation required is to secure the upper and lower vertical sections of the end wall herein to the front, back and bottom walls to close the ends of the truck box. This construction greatly simplifies the fabrication of aluminum truck boxes and appreciably reduces labor and material costs.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
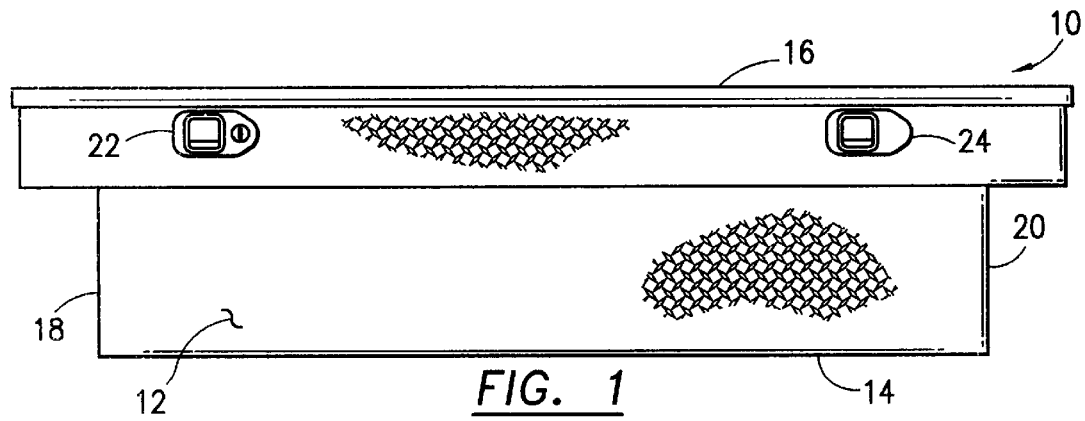
FIG. 1 is a front view of a single lid, cross-over type truck box.

Referring now to the drawings, a single lid cross-over type truck box 10 is illustrated having a front wall 12, bottom wall 14, top wall or lid 16, opposed side walls 18 and 20, and, a back wall (not shown). Each of the walls 12–20 is formed of aluminum treadplate, mill finish aluminum, or, alternatively, steel, and they are interconnected by welding to form a hollow interior. The top lid 16 is conventionally opened and closed by operation of a pair of paddle latches 22 and 24, the details of which form no part of this invention and are therefore not described herein. As noted above, a single lid, cross-over type truck box is depicted in the Figs. It should be understood that the following discussion involving a detailed description of the end walls 18, 20 is equally applicable to other truck boxes including double lid cross-over boxes.

Figure 2:
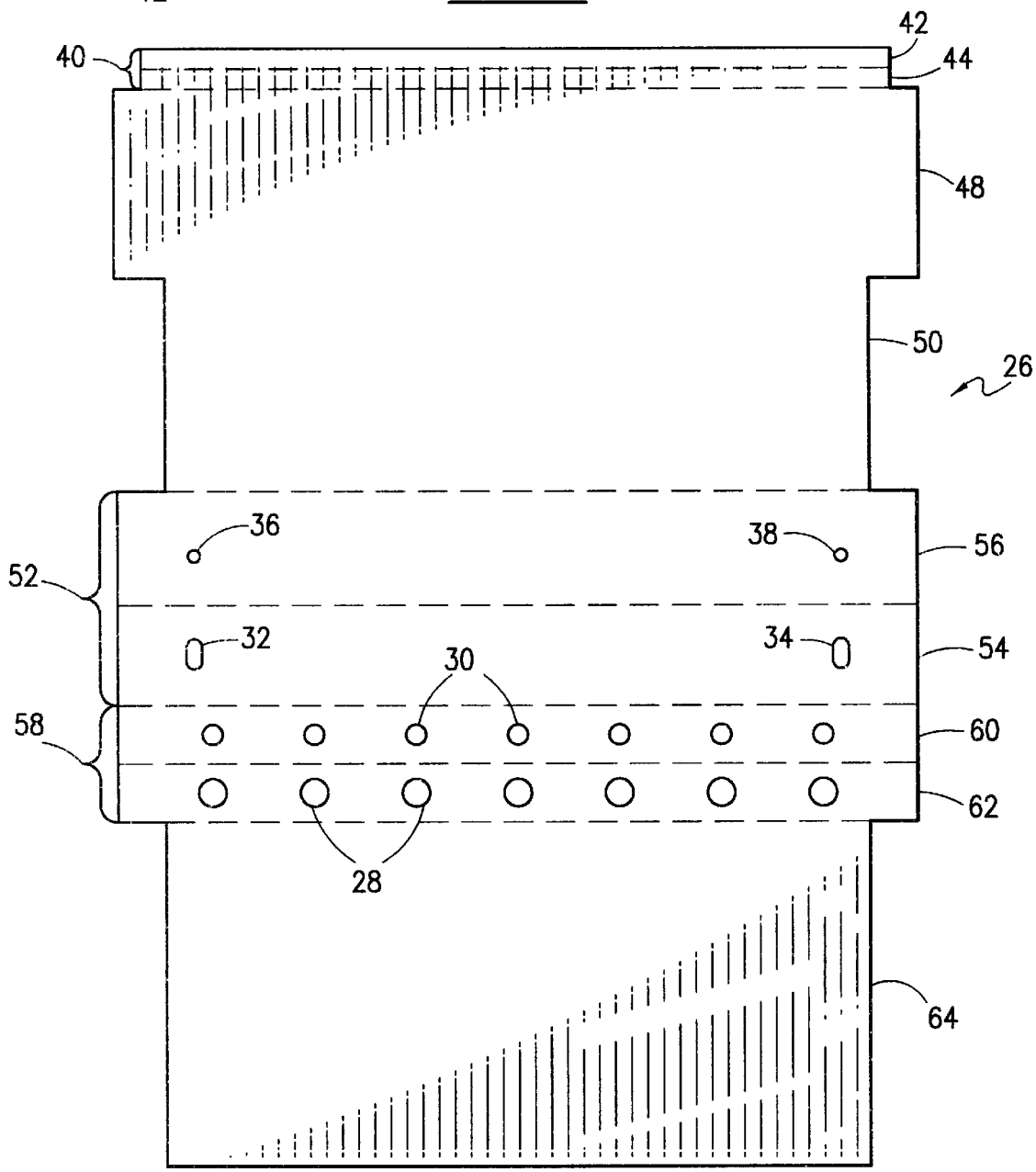
FIG. 2 is a plan view of a section of aluminum tread plate which has been formed preparatory to the bending operation.
Figure 3:
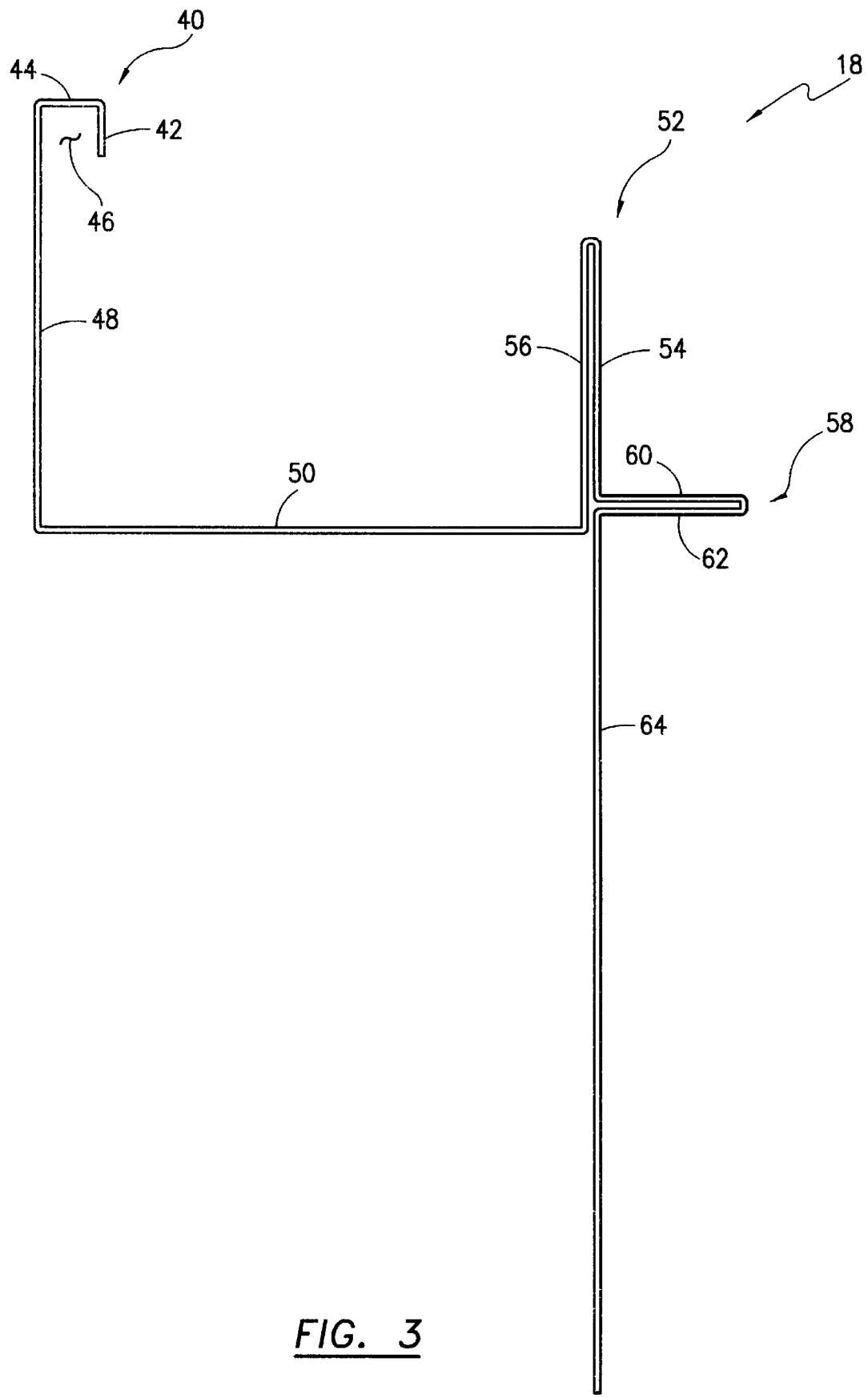
FIG. 3 is a side view of the plate depicted in FIG. 2 after bending.

With reference to FIGS. 2 and 3, the end wall 18 of truck box 10 is depicted in detail. The other end wall 20 has the identical construction, and therefore the following discussion is equally applicable to such end wall 20. In the presently preferred embodiment, the end wall 18 is formed from a single, continuous section of aluminum plate 26 which is stamped, punched and/or otherwise formed in the configuration depicted in FIG. 2. The plate 26 has a series of spaced bores 28 of one diameter, and a series of aligning, spaced bores 30 of a smaller diameter for purposes to become apparent below. Additionally, a pair of slots 32 and 34 are formed on opposite sides of the plate 26 which align with bores 36 and 38, respectively.

For ease of illustration and discussion, the plate 26 is shown in FIG. 2 with a series of transversely oriented, longitudinally spaced dotted lines at selected locations along the length thereof. These dotted lines are meant to depict the locations where a brake or other bending mechanism is operative to bend the plate 26 to form the configuration of end wall 18 illustrated in FIG. 3. Such dotted lines are not meant to depict perforations or the like, but are shown merely for purposes of illustration.

As seen in FIG. 3, the aluminum plate 26 undergoes a bending operation to form a continuous, one-piece end wall 18. In the presently preferred embodiment, end wall 18 includes an uppermost channel 40 having a side wall 42, top wall 44 and an open bottom 46. For purposes of the present discussion, the terms "top" and "upper" refer to a position at the top of the sheet containing FIG. 3, whereas the terms "lower" and "bottom" refer to the opposite direction. A "vertical" direction or orientation refers to the vertical direction with the end wall 18 oriented in the position depicted in FIG. 3, whereas the term "horizontal" refers to a direction perpendicular to vertical.

The channel 40 is integrally connected with an upper vertical section 48 which extends from the channel 40 to a horizontal section 50. In turn, the horizontal section 50 extends from the upper vertical section 48 to a vertical partition 52 formed by bending a first section 54 and a section 56 against one another as shown in FIG. 3. In this folded position, the slots 32, 34 in section 54 align with the bores 36, 38, respectively, in section 56. See FIG. 4.

A second, double walled element of the end wall 18 extends from vertical partition 52. This horizontally extending section or tool holder 58 is formed by bending third section 60 and fourth section 62 against one another so that the bores 28 in section 62 align with the bores 30 in section 60. Finally, a lower vertical section 64 extends at a right angle from the fourth section 62 of tool holder 58.

Figure 4:
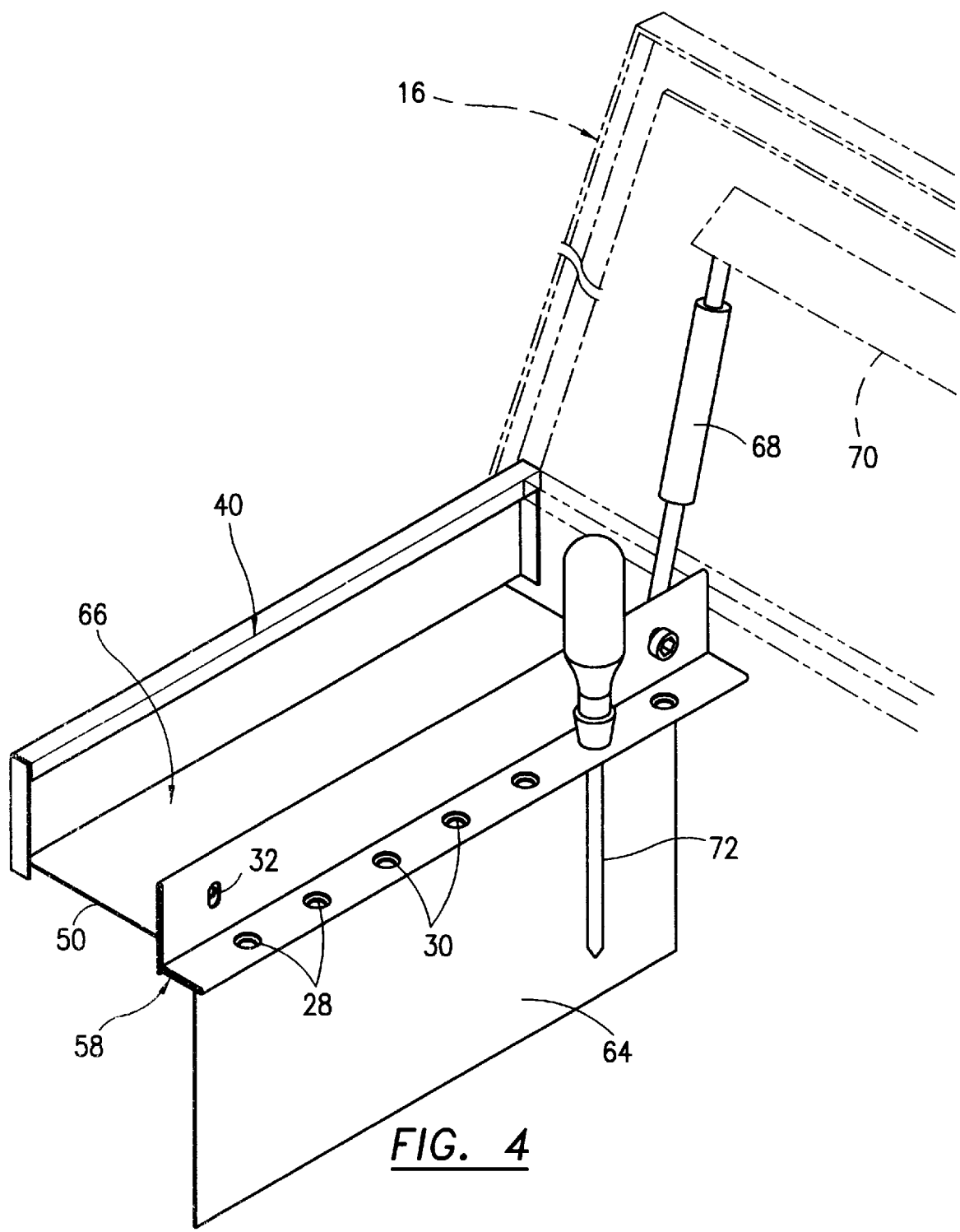
FIG. 4 is a partial perspective view of the truck box of FIG. 1 incorporating the end wall of this invention, with a gas spring in position between the end wall and top lid.

As schematically depicted in FIG. 4, the one-piece, continuous end wall 18 of this invention contains structural elements that were previously individually formed and then interconnected by welding. The upper vertical section 48, horizontal section 50 and vertical partition 52 collectively define a compartment 66 for the storage of small items such as hand tools and the like. The aligning bore 38 and slot 34 formed in the vertical partition 52 receive and mount one end of a gas spring 68, which is employed to assist with lifting of the top lid 16 of truck box 10. The opposite end of gas spring 68 is affixed to a reinforcing bar 70 associated with the top lid 16, as schematically shown in FIG. 4. The aligning slot 32 and bore 36 formed on the opposite end of vertical partition 52 are utilized to mount the gas spring 68 on the opposite end of the truck box 10 where the end wall 20 is located (not shown). Additionally, the aligning bores 28 and 30 formed in the tool holder 58 receive and mount screwdrivers 72 or other small tools, as desired.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A truck box comprising:
    a front wall, back wall, bottom wall, opposed end walls and at least one top lid interconnected to form a hollow interior, said front wall, back wall and opposed end walls extending vertically upwardly from said bottom wall;
    each of said end walls being formed from a one-piece, continuous plate which is bent at selected locations to define an upper vertical section, a vertically extending partition, a horizontal section extending between said upper vertical section and said vertically extending partition, and, a lower vertical section extending from said vertically extending partition.

2. The truck box of claim 1 in which said plate is a continuous section of aluminum plate.

3. The truck box of claim 1 further including a channel formed at one end of said upper vertical section, said channel including opposed side walls, a top wall extending between said side walls and an open bottom.

4. The truck box of claim 1 in which said vertically extending partition is formed by bending a portion of said plate against itself.

5. The truck box of claim 1 further including at least one gas spring, said at least one gas spring being connected between said vertically extending partition of one of said end walls and said at least one top lid.

6. The truck box of claim 1 further including a tool holder which connects said lower vertical section with said vertically extending partition.

7. The truck box of claim 6 in which said tool holder comprises a first section of said plate formed with a number of spaced first bores, and a second section of said plate formed with a number of spaced, second bores, said first and second sections being bent into a position parallel to one another so that said first and second bores align to receive and mount tools.

8. The truck box of claim 6 in which said tool holder is oriented substantially parallel to said horizontal section.

9. The truck box of claim 1 further including at least one gas spring, said vertically extending partition being formed from a first section and a second section which are bent into a position parallel to one another, each of said first and second sections being formed with a bore, said bores aligning with one another to receive and mount one end of said at least one gas spring, the other end of said at least one gas spring being mounted to said at least one top lid.

10. A truck box comprising:
   a front wall, back wall, bottom wall, opposed end walls and at least one top lid interconnected to form a hollow interior, said front wall, back wall and opposed end walls extending vertically upwardly from said bottom wall;
   each of said end walls being formed from a one-piece, continuous plate which is bent at selected locations to define an upper vertical section, a vertically extending partition, a first horizontal section extending between said upper vertical section and said vertically extending partition, a second horizontal section extending from said vertically extending partition, and a lower vertical section extending from said second horizontal section.

11. The truck box of claim 10 in which said plate is a continuous section of aluminum plate.

12. The truck box of claim 10 further including a channel formed at one end of said upper vertical section, said channel including opposed side walls, a top wall extending between said side walls and an open bottom.

13. The truck box of claim 10 in which said vertically extending partition is formed by bending a portion of said plate against itself.

14. The truck box of claim 10 further including at least one gas spring, said at least one gas spring being connected between said vertically extending partition of one of said end walls and said at least one top lid.

15. The truck box of claim 10 in which said second horizontal section comprises a first section of said plate formed with a number of spaced first bores, and a second section of said plate formed with a number of spaced, second bores, said first and second portions being bent into a position parallel to one another so that said first and second bores align to receive and mount tools.

16. The truck box of claim 10 further including at least one gas spring, said vertically extending partition being formed from a first section and a second section which are bent into a position parallel to one another, each of said first and second sections being formed with a bore, said bores aligning with one another to receive and mount one end of said at least one gas spring, the other end of said at least one gas spring being mounted to said at least one top lid.

* * * * *